US010077987B2

(12) United States Patent
Maurer et al.

(10) Patent No.: US 10,077,987 B2
(45) Date of Patent: Sep. 18, 2018

(54) DYNAMICALLY INTEGRATING OFFLINE AND ONLINE DATA IN A GEOGRAPHIC APPLICATION

(71) Applicant: GOOGLE INC., Mountain View, CA (US)

(72) Inventors: Jennifer Maurer, Seattle, WA (US); Sean Chuan Wen, Seattle, WA (US)

(73) Assignee: GOOGLE LLC, Mountain View, CA (US)

( * ) Notice: Subject to any disclaimer, the term of this patent is extended or adjusted under 35 U.S.C. 154(b) by 86 days.

(21) Appl. No.: 15/167,188

(22) Filed: May 27, 2016

(65) Prior Publication Data

US 2016/0349063 A1 Dec. 1, 2016

Related U.S. Application Data

(60) Provisional application No. 62/167,885, filed on May 28, 2015.

(51) Int. Cl.
*G01C 21/34* (2006.01)
*G01C 21/36* (2006.01)
(Continued)

(52) U.S. Cl.
CPC .......... *G01C 21/34* (2013.01); *G01C 21/343* (2013.01); *G01C 21/3415* (2013.01);
(Continued)

(58) Field of Classification Search
None
See application file for complete search history.

(56) References Cited

U.S. PATENT DOCUMENTS 5,522,041 A * 5/1996 Murakami ............... G06T 1/00
709/203
6,587,785 B2 * 7/2003 Jijina ................. G01C 21/3415
701/117
(Continued)

FOREIGN PATENT DOCUMENTS

EP 1 253 401 A2 10/2002

OTHER PUBLICATIONS

International Search Report and Written Opinion for Application No. PCT/US2016/034632, dated Oct. 24, 2016.

*Primary Examiner* — Redhwan K Mawari
*Assistant Examiner* — Edward Torchinsky
(74) *Attorney, Agent, or Firm* — Marshall, Gerstein & Borun LLP

(57) ABSTRACT

A request for navigation directions for travelling from a source location to a destination location is received. Using data that was stored in a memory of a computing device prior to the request, first navigation directions for travelling from the source location to the destination location are generated, and a request for navigation directions for travelling from the source location to the destination location is transmitted to an online server. After second navigation directions for travelling from the source to the destination are received, it is determined whether a difference between the first navigation directions and the second navigation directions exceeds a threshold level. When the difference between the first navigation directions and the second directions route does not exceed the threshold level, the second navigation directions are merged into the first navigation directions.

18 Claims, 11 Drawing Sheets

(51) Int. Cl.
*H04L 29/06* (2006.01)
*G08G 1/0968* (2006.01)
*H04W 8/18* (2009.01)
*H04W 24/08* (2009.01)

(52) U.S. Cl.
CPC ..... *G01C 21/3492* (2013.01); *G01C 21/3626* (2013.01); *G08G 1/096833* (2013.01); *H04L 67/42* (2013.01); *H04W 8/183* (2013.01); *H04W 24/08* (2013.01)

(56) References Cited

U.S. PATENT DOCUMENTS

| | | | | |
|---|---|---|---|---|
| 7,496,444 | B1* | 2/2009 | Fried | G01C 21/3679 340/988 |
| 8,620,319 | B1* | 12/2013 | Thandu | H04W 48/02 370/331 |
| 2002/0161519 | A1* | 10/2002 | Mori | G01C 21/3492 701/414 |
| 2006/0064241 | A1* | 3/2006 | Rasmussen | G01C 21/3641 701/400 |
| 2011/0010091 | A1* | 1/2011 | Currie | G01C 21/32 701/532 |
| 2011/0264366 | A1* | 10/2011 | Cabral | G01C 21/3415 701/533 |
| 2015/0369617 | A1* | 12/2015 | Ding | G01C 21/34 701/428 |
| 2016/0349063 | A1* | 12/2016 | Maurer | G01C 21/34 |

* cited by examiner

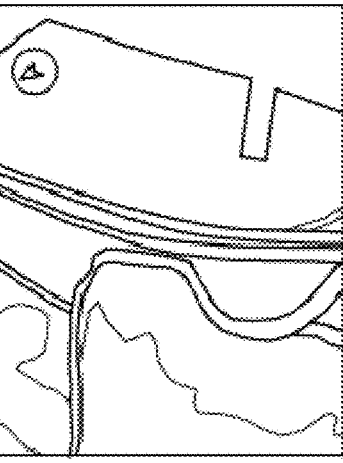
FIG. 7C
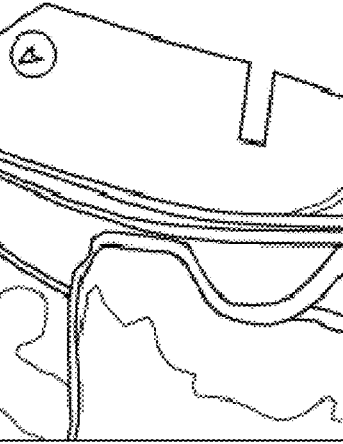
FIG. 7B
FIG. 7A

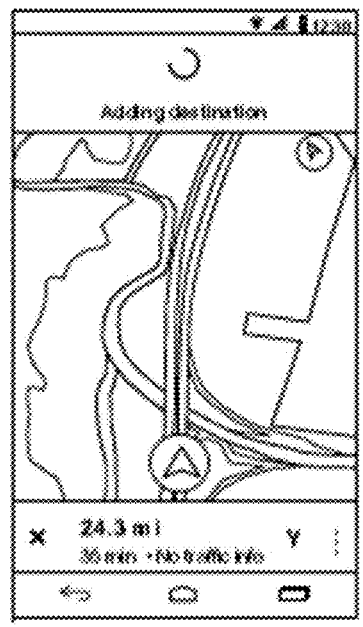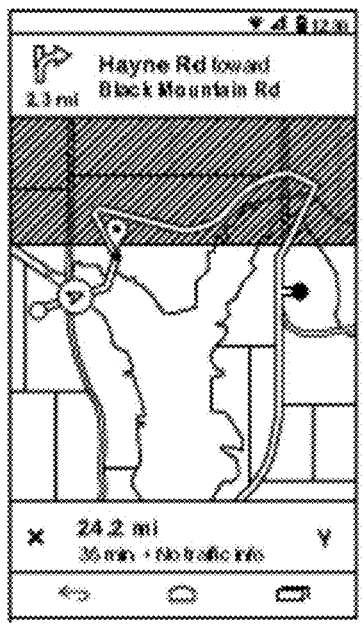
FIG. 7D  FIG. 7E
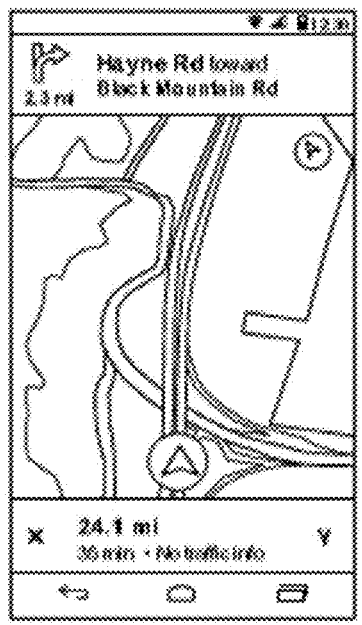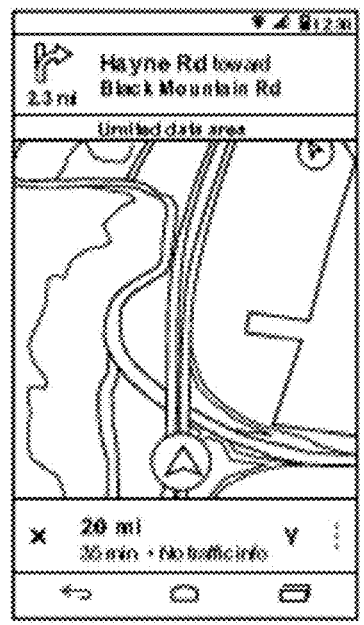
FIG. 7F  FIG. 7G

DYNAMICALLY INTEGRATING OFFLINE AND ONLINE DATA IN A GEOGRAPHIC APPLICATION

FIELD OF TECHNOLOGY

This disclosure relates to interactive digital maps and, more particularly, to managing offline map data in client devices.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Software applications that provide interactive digital maps, display driving directions, and support various geographic functions ("geographic applications") can operate on a variety of user devices, including desktop computers, laptop computers, tablet computers, smartphones, car navigation systems, etc. In some cases, user devices have a substantially permanent network connection such as a Digital Subscriber Line (DSL) or a cable Internet connection. In other cases, user devices attempt to access network servers via wireless communication channels that are subject interruption, fluctuations in the quality of service, high prices (e.g., roaming charges), etc. Further, in some situations, user devices have no network connection at all.

As a result, geographic applications cannot always access network servers to service user requests. Moreover, while the operating system of a user device can easily identify some of the issues with wireless connectivity, such as when the user device is in the airplane mode or when the wireless service provider specifies second-generation (2G) capability rather than third-generation (3G) connectivity or higher, other connectivity issues are more difficult to detect and may be sudden, such as when a router or a data server appears to be available but fails to respond, or when the user requests a digital map of an area as she is walking away from a hotspot. As another example, a user may request driving directions via her smartphone before she pulls out of an underground garage, when no network connection is available, and the smartphone acquires network connectivity shortly after the user starts driving.

SUMMARY

A geographic application operating in a user device such as a smartphone retrieves map data and various types of geospatial data from a remote server in an online mode when a network connection of acceptable quality is available, and also stores certain map data and geospatial data in device more so as to provide navigation directions, geographic search results, geographic suggestions, etc. when the user device is operating in an offline mode. The geographic application accordingly supports certain geographic functions in both modes. To make transitions between the limited offline data and the more robust online data seem seamless when the user device transitions between the online mode and the offline mode, the geographic application dynamically merges offline and online data in view of such factors as the timing of arrival of online data and the difference in quality between the already-available offline line and the arriving online data. Further, the geographic application in some scenarios dynamically determines when offline data should be displayed to the user, when an indication that online is being requested should be displayed to the user, and when online data should be displayed to the user, in view of timing-of-arrival, quality, and possibly other factors.

When providing suggestions regarding potentially relevant search results, such as when the user types in a partially completed search term or the name of a location, the geographic application can determine the difference in quality between offline and (actual or potential) online suggestions in view of how precisely the current location of the user device can be determined. For example, when the current location of the user device is relatively precise, the geographic application can immediately display an offline suggestion, but when the current location of the user device is less precise, the geographic application may first attempt to obtain an online suggestion, arm a timer, and display offline suggestions only when the timer expires. Further, the geographic application may determine whether an offline suggestion should be displayed immediately in view of the number of available offline suggestions (e.g., a single offline suggestion may be associated with a higher probability of being relevant). If and when the geographic application receives one or more online suggestions, the geographic application may provide a control such as a button for upgrading the offline suggestions to the new online suggestions, if the online data is different and/or more robust than the offline data currently being displayed. Further, when the user requests suggestions for a large category (e.g., "gas," "French restaurants), the geographic application can automatically set a longer timeout that limits the wait for online suggestions.

When the user requests navigation directions, in some cases the geographic application can immediately generate a navigation route using offline data ("offline directions" defining one or more "offline routes") and display the result over a digital map, for example, or a set of step-by-step instructions. If the geographic application subsequently receives navigation data from the navigation server ("online directions" defining one or more "online routes"), the geographic application can provide the update via a user interface in the least disruptive manner, such as by providing a UI control for viewing the online directions as an alternate route. When the geographic application determines that the recommended online directions define the same route as the offline directions, the geographic application can merge traffic data into the presentation of the offline directions. When the geographic application determines that the recommended online directions differ from the offline directions, the geographic application may retain the offline route as a deselected alternative after the user selects one of the online routes, even if the offline route does not correspond to any of the online routes.

The geographic application also can store a subset of the available information regarding businesses, points of interest, and other places for presentation in the offline mode. For example, the geographic application can store the telephone number for a business, the hours of operation, the number of ratings received and the average on a certain scale, the address, and, when available, an editorial summary (e.g., a statement of 40 characters of less). If the geographic application subsequently receives online data, the geographic application can augment the corresponding listings with additional data, which can include longer summaries, review text, website information, street-level imagery, photographs, etc.

Further, when the geographic application generates an offline route that traverses an area for which no potentially relevant offline geospatial data is available, the geographic application can generate an appropriate notification, so as to give the user an opportunity to plan accordingly. For example, the geographic application may indicate that the geographic application would not be able to generate alternate and/or return routes if the user deviates from the route, or that the geographic application would not be able to provide information about businesses along the route. During navigation along an offline route, the geographic application can notify the user that an area with no offline geospatial data is approaching within a certain threshold distance of the area. The indication also may include an indication of how long the area is. Further, the geographic application can suggest a category of places which the user may wish to add to the navigation route prior to reaching the area with no offline data. For example, the geographic application may automatically provide a suggestion that the user stop at a gas station before reaching the area where the geographic application will not be able to make a suggest of this type.

BRIEF DESCRIPTION OF THE DRAWINGS

FIGS. 7A-G are example screenshots which a geographic application can generate when executing the method of FIG. 5C.

DETAILED DESCRIPTION OF THE DRAWINGS

Overview of an Example System and Portable Device

Figure 1:
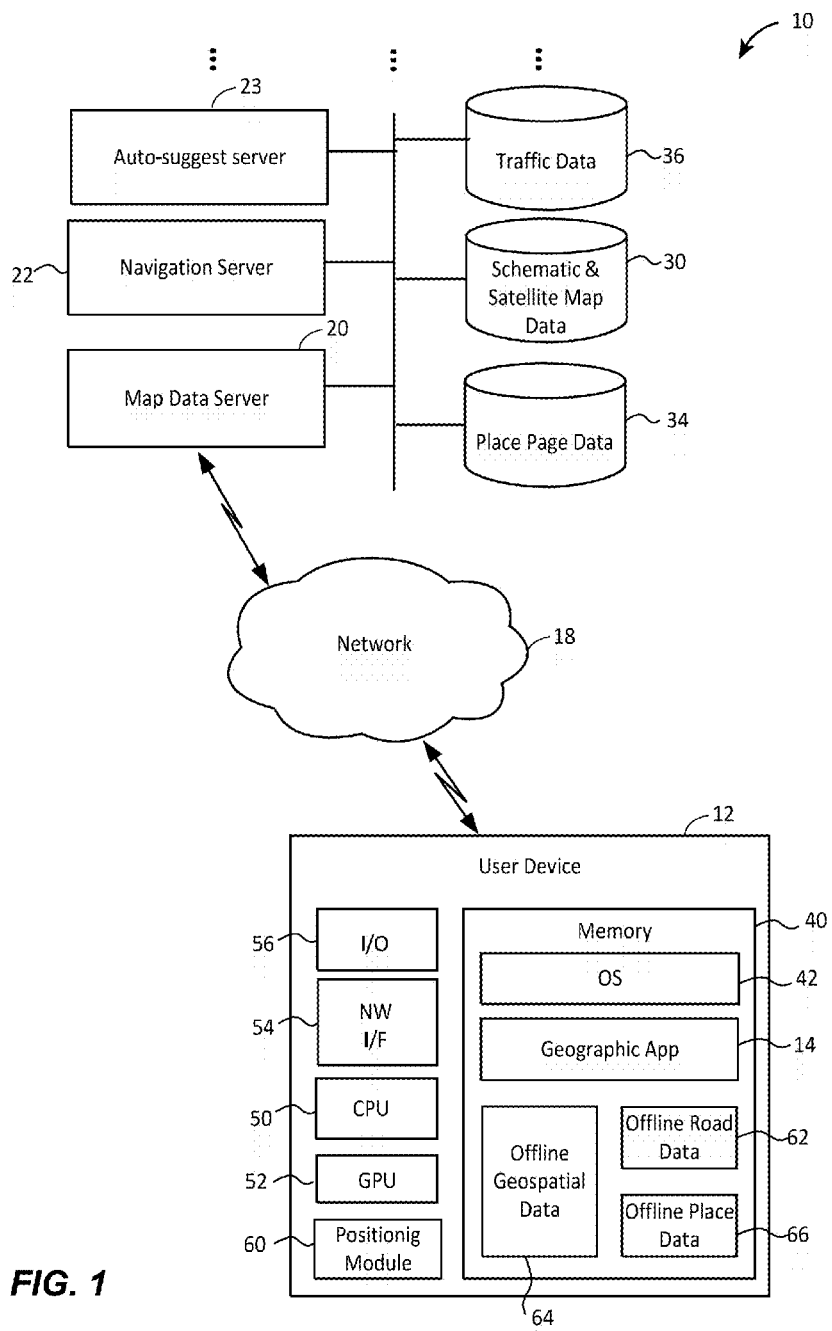
FIG. 1 is a block diagram of an example system in which a client device utilizes online data, offline data, and combinations of online and offline data when servicing requests for geographic data, in accordance with the techniques of this disclosure.

An example system in which the techniques outlined above can be implemented is discussed with reference to FIG. 1.

An example system 10 includes a user device (or "computing device") 12, a map data server 20, a navigation server 22, and an auto-suggest server 23. Depending on the implementation, the user device 12 can be, for example, a smartphone, a tablet computer, a wearable computing device, a laptop computer, a desktop computer, a portable navigation device, etc. The user device 12 in general can be portable or non-portable, and can be a general-purpose computing device or a special-purpose (e.g., embedded) device such as a navigation system operating in the head unit of a conventional vehicle or a self-driving vehicle. However, for ease of illustration, the techniques for providing navigation directions and other geospatial data are discussed below primarily with reference to a portable user device.

The user device 12 is coupled to the servers 20, 22, and 23 via one or more connections in one or more communication networks 18, which can be any suitable local or wide area network (s) including a WiFi network, a Bluetooth network, a cellular network such as 3G, 4G, Long-Term Evolution (LTE), the Internet, etc. The user device 12 also can communicate with additional content providers, servers, etc., via the communication network 18. In an example implementation, the user device 12 may be a smartphone connecting to a remote server such as the navigation server 22 over an LTE network.

The map data server 20, navigation server 22, and the auto-suggest server 23 are coupled to several databases, such as a map database 30 which stores schematic and satellite data storing street and road information, topographic data, satellite imagery, etc., a place page database 34 that stores business hours, telephone numbers, email addresses, links to websites, reviews, business-specific specific content such as menus, etc. for various businesses, and a traffic database 36 which includes current traffic conditions and, in some implementations, weather data, road closure data, estimated time data, etc. In general, the servers 20, 22, and 23 can receive information related to geographic locations from any number of suitable databases, web services, etc., and the system 10 can include, or have access to, any number of additional servers.

One or more operators can periodically update the databases 30, 34, and 36, where each operator provides updates to these databases at respective time intervals. For example, the traffic database 36 may store substantially real-time data, whereas the schematic and satellite database 30 may be updated relatively infrequently, such as once a week, and the place page data 34 can be updated on an ad hoc basis when new information about businesses and other places becomes available, or when the system 10 receives indications of businesses being closed, for example.

The schematic and satellite database 30 can store data in a raster format, a vector format, in any other suitable format or any combination thereof. In some implementations, the data is organized into map tiles at multiple zoom levels to facilitate serving map data to client devices. Depending on the implementation, the navigation server 22 can provide map and directions data to client devices separately or together in map tiles, for example. In other embodiments, the map data and navigation directions may be generated remotely on remote servers separate from the map data server 20 and navigation server 22. Moreover, in some embodiments, the map and navigation directions may be generated by a combination of the map data server 20, the navigation server 22, and any number of additional servers.

In an example implementation, the user device 12 includes a memory 40, one or more processor(s) (CPU) 50, a graphic processing unit (GPU) 52, a network interface unit 54, and an I/O module 56 with a user interface for displaying map data and directions. The user device 12 also includes a positioning module 60 which can be a Global Positioning System (GPS) receiver, for example. In some embodiments, the user device 12 may transmit the offline navigation directions and/or the online navigation directions to a user interface on another device for display such as on a head unit of a vehicle (not shown).

The memory 40 may be tangible, non-transitory memory and may include any types of suitable memory modules, including random access memory (RAM), read only memory (ROM), flash memory, other types of persistent memory, etc. The memory 40 stores an operating system (OS) 42 and one or more applications or modules including a geographic application 14. The operating system 42 may be any type of suitable operating system such as modern smartphone operating systems, for example. The I/O module 56 may be a touchscreen, for example. More generally, these techniques can be implemented in other types of devices, such as laptop or desktop computers, car navigation units, etc.

The geographic application 14 generates a digital map using vector graphic data, raster tiles, or map data in any other suitable format for display on a screen. As discussed in more detail below, the geographic application 14 can generate online and offline navigation directions, provide geographic suggestions using online and offline data, dynamically merge various online and offline content, etc. Depending on the implementation, the geographic application 14 can be a separate executable made up of compiled instructions that execute directly on the operating system 42, instructions in a scripting language (or another suitable format) that are interpreted at run time by another application such as a web browser, a plugin that extends the functionality of another software application, etc. In one example implementation, the geographic application 14 is an "app" downloaded onto the portable computing device 12 from a web server. Moreover, the geographic application 14 in some implementations may be a web browser.

In operation, the geographic application 14 requests navigation directions and, depending on the scenario, supplemental data including traffic information from the navigation server 22. When the user device 12 cannot connect to a network 18, the network connectivity is limited, the network connection is of poor quality, or the navigation server is otherwise unavailable due to the type of wireless subscription, the distance from a wireless access point etc., the geographic application 14 can generate the navigation directions locally using offline road data 62. The user device 12 also can utilize offline geospatial data 64 and offline place 66, examples of which are provided below.

Generally speaking, the offline data 62, 64, 66, etc. can include data which the user device 12 stores in anticipation of a subsequent user request for this data. The subsequent request may be explicit, such as the user specifying a street address and activating a control for requesting a digital map centered at the specified street address. The subsequent request also can be implicit, such as when the user explicitly requests only navigation directions from a source to a destination, and the geographic application 14 also provides information related to places of interest, gas stations, etc. along the way. In either case, offline data such as the offline data 62, 64, and 66 can correspond to geographic/geospatial data which the geographic application 14 requests from the servers 20, 22, etc. based on a certain probability that the geographic application 14 will require the data at a later time. The geographic application 14 can estimate this probability and make specific data selections in view of such signals as user's home and work address, user's preferences, locations saved by the user, requests for navigation directions previously submitted by the user, network coverage information (e.g., when the user is expected to travel to an area with no network coverage or roaming-only network coverage), etc. In some embodiments, the user operates certain controls and/or installs certain applications to allow the geographic application 14 to use these signals and store such information as part of the offline data.

More specifically, the offline road data 62 can be stored in a cache implemented in the memory 40. Depending on the implementation, the offline road data 62 can describe such parameters as road geometry (e.g., lengths of road segments), locations of intersections and allowed maneuvers at the intersections (e.g., left and right turns available from road A onto B, only right turn available from road B onto A), road type information (e.g., interstate highway, local road, local street), allowed directions of travel (e.g., one-way, two-way), speed limit data, etc. Moreover, the offline road data 62 in some implementations can include lane-specific information (e.g., number of lanes, carpool lane indications and other lane-specific restrictions). The offline road data 62 can be generally similar to the road data in the map database 30, which the navigation server 22 utilizes to generate navigation directions. However, in at least some of the implementations, the user device 12 does not store all the road data available to the navigation server 22. Rather, the user device 12 may store offline road data for such places as, for example, the area near the user's home, the area near the user's office, areas along the route from the user's home to her office, areas around popular locations, areas surrounding the locations frequently visited by the user, etc. Moreover, the offline road data 62 can include road/map data transformed into data structures that no longer directly represent roads to aid in efficient calculation of navigation directions.

In some scenarios, the geographic application 14 may decide to cache offline road data for the entire town, city, country, state, etc. where the user lives. In some embodiments, in order for the user to take advantage of these techniques, the user may need to select a setting and/or install an application. Generally speaking, the geographic application 14 can select the geographic coverage and the level of detail for the offline road data 62 in view of such factors as availability of memory, estimated probability of certain directions being requested by the user, estimated probability of the user device 12 losing network coverage, etc. Further, the user in some implementations of the geographic application 14 may manually select geographic areas for which the geographic application 14 should cache the offline road data 62.

As an example, the geographic application 14 can generate navigation directions that include step-by-step instructions for travelling from a first location to a second location.

Each instruction can describe a maneuver (e.g., turn left, continue going straight, etc.), the time for presenting a description of the maneuver (e.g., 500 feet prior to reaching the point of maneuver), any other suitable navigation information, or any combination thereof. In some cases, navigation directions describe maneuvers for a bicyclist, a pedestrian, a motorist, etc. When requesting navigation directions, the user can specify whether she is driving, bicycling, walking, or using public transit. The geographic application 14 may store an indication of the last transportation mode selected by the user device 12 and, in some implementation, use this indication to select data for retrieval from the servers 20 and 22 and storage as part of the offline road data 62.

The offline geospatial data 64 can include such information as previously submitted geographic search queries and the corresponding search results, locations of places of interest, etc. The offline place page data 66 can include, for certain places, such information as the hours of operation, the telephone number, the number of ratings received and the average of these rating, an editorial summary of a certain limited length, etc. In an implementation, the offline place page data 66 for a certain place is a compact subset of the data available in the place page database 34. In some cases, the available online data is also stored offline. The geographic application 14 can select the offline geospatial data 64 and the offline place page data 66 using signals similar to those discussed above with reference to the offline road data 62. It will be understood that FIG. 1 illustrates the separation of the data 62, 64, and 66 only schematically, and that the user device 12 can organize offline data in any suitable manner.

Example Techniques for Providing Navigation Directions

Generally speaking, the geographic application 14 uses offline road data 62 to provide navigation directions in the offline mode and, if and when online road data arrives at the user device 12, the geographic application 14 seamlessly merges the online data into the offline route, when possible, or presents the online route to the user as the best option.

In an example scenario, John is driving from Philadelphia to New York City. Before John pulls out of the underground garage in he is parked, he requests navigation directions via his smartphone. Because the smartphone cannot successfully connect to a wireless network, the geographic application generates offline navigation directions using offline map data stored from his past trips between Philadelphia and New York. It is highly likely that the offline map data is sufficient for generating a geometrically optical or near-optimal route; however, John may not have accurate traffic data or a good time estimate for the route. Accordingly, the geographic application may continue to attempt reaching an online navigation server.

As John begins to follow the offline route, the smartphone at some point finds an available wireless network and the geographic application successfully reaches the online navigation server. After the geographic application receives online navigation data defining one or more online navigation routes, the geographic application compares the online navigation data to the offline navigation data used to generate the offline route in order to identify the least level of interruption for the user. In particular, the geographic application can generate a difference metric and, when the difference metric is within a threshold/target value/range, the geographic application updates the offline route with traffic information to reflect the new information. For example, John now may be able to see that the highway twenty miles ahead of his current location is congested.

Figure 2:
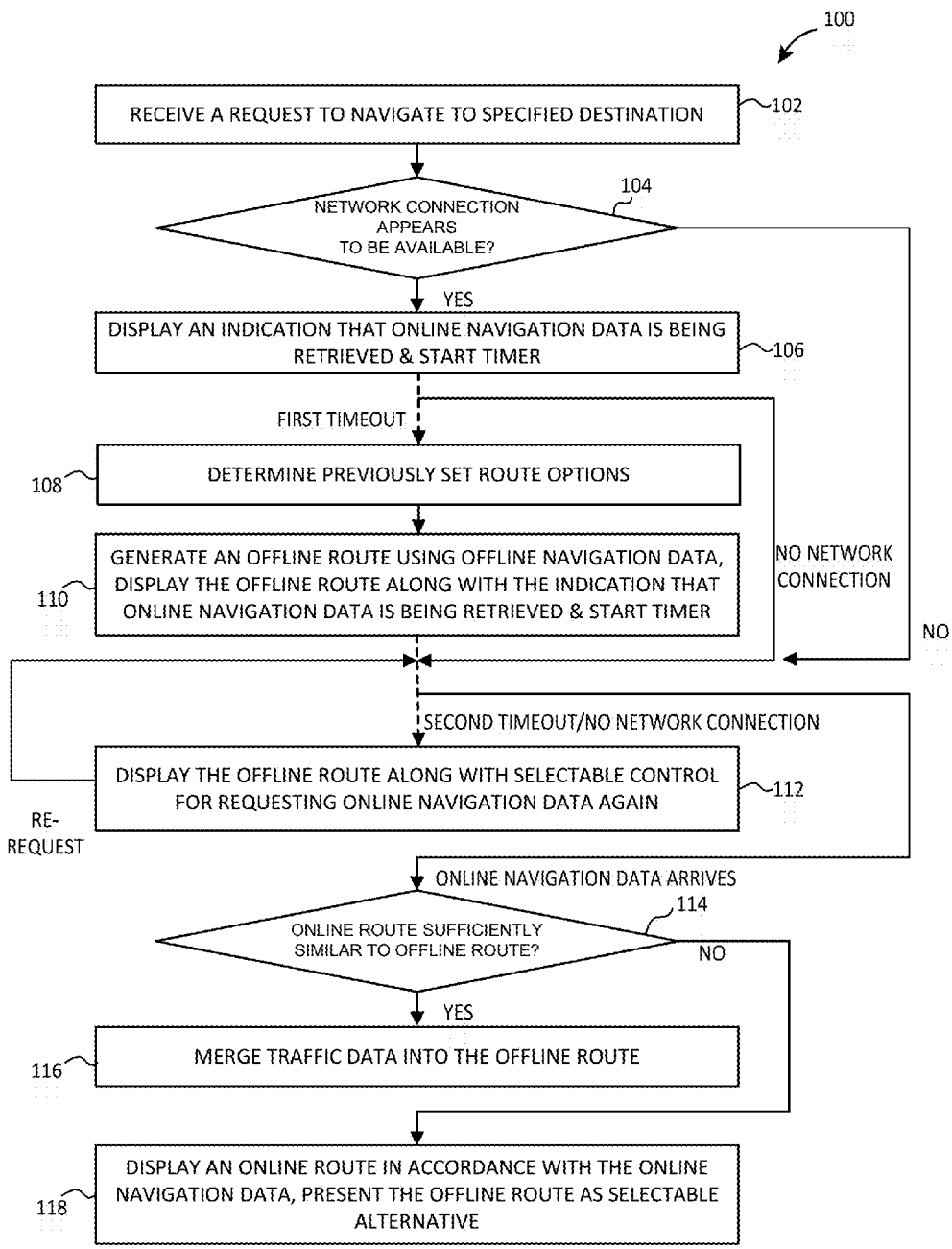
FIG. 2 is a flow diagram of an example method for providing navigation directions using online and offline data, which can be implemented in a geographic application executing on the client device of FIG. 1.

Referring to FIG. 2 and the example screenshots of FIGS. 3A-G, an example method 100 for using online and offline navigation data to provide a navigation route to a user in a generally non-disruptive manner. The method 100 can be implemented in the geographic application 14 of FIG. 1, for example. More generally, however, the method 100 can be implemented as a set of instructions executable one or more processors of any suitable device or a group of devices.

Figure 3A:
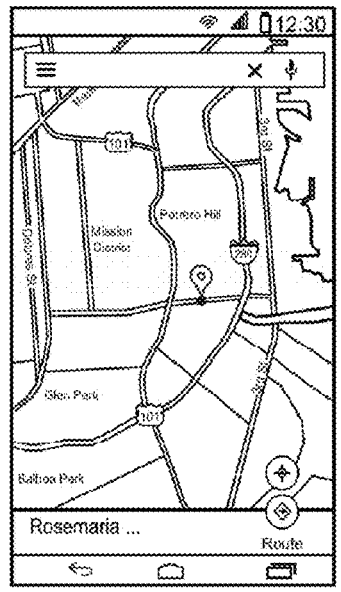
FIGS. 3A-3G illustrate some of the example screenshots which a geographic application can generate when providing navigation directions in accordance with the method of FIG. 2.
Figure 3B:
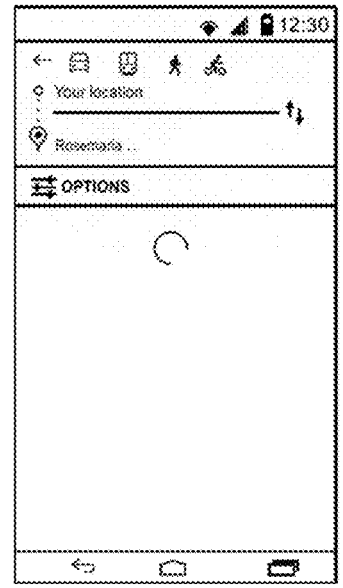

At block 102, a request to navigate the user to a specified destination is received. As illustrated in FIG. 3A, for example, the user may tap on the button for requesting driving directions to a location selected on the map and marked with a place indicator. At block 104, it is determined whether a network connection is currently available and, if so, the flow proceeds to block 106. Otherwise, the flow proceeds directly to block 112.

As indicated above, network coverage in some cases may appear to be available to a portable user device without actually being available. At block 106, an indication is display that online navigation data is being retrieved. An example of such interface is illustrated in FIG. 2B. A timer also can be started at block 106 to determine whether the flow should transition to block 108 or 112. When offline navigation data is available, the timer started at block 106 can be relatively short, such as several milliseconds (and even, in some embodiments, can be set to zero). If it is determined that no network coverage is available before the timer expires, the flow proceeds to block 112.

Figure 3C:

Otherwise, the timer expires at block 108, and the geographic application executing the method 100 can determine whether the user previously had specified any route options, such as "no tolls," for example. Next, at block 110, an offline route is generated using offline navigation data. However, at this point, an indication that the geographic application is trying to also retrieve online data can be displayed. FIG. 3C illustrates an example screen in an offline route is presented along with an indicator of a continuing retrieval of online data. Further, a timer can be started at block 110 to ensure that the user does not await online navigation data for too long. This timer can be configured to expire in several seconds, for example.

Figure 3D:
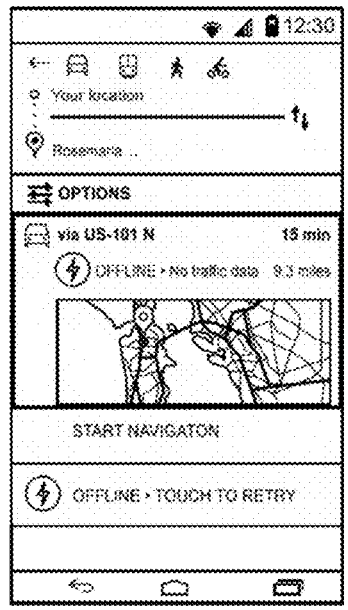

If the timer expires before online data is received, the flow proceeds to block 112, where the offline route is displayed along with a selectable option for re-submitting the request for online navigation directions. An example screen corresponding to block 112 is illustrated in FIG. 3D. Otherwise, if online data is received before the timer expires, the flow proceeds to block 114.

At block 114, it is determined whether the online is sufficiently proximate to the offline route. To this end, the geographic application 14 may represent each of the offline route and the online route as a set of waypoints spaced at certain intervals along the corresponding route and determine the number of waypoints which differ between the set of online navigation directions and the offline navigation directions. For example, the geographic application 14 may determine the offline navigation directions have 9 waypoints in common with the set of online navigation directions and 2 waypoints which differ. In some embodiments, if the user begins navigating by following the turn-by-turn directions, waypoints which have been passed may be discarded whereas waypoints which are coming up shortly may be weighted more heavily. For example, if the offline navigation directions have 5 waypoints in common with the set of online navigation directions and 5 waypoints which differ, but the user has passed 2 of the waypoints which differ and 2 of the waypoints in common are very close to the user than the digital navigation module 44 may determine the metric of the difference between the online and offline navigation directions is small.

Figure 3E:

If the routes are not sufficiently similar, at block 118, an indicator of now-available online routes is generated, along with a control for activating the display of online route(s) as illustrated in FIG. 3E. In this manner, the user can switch to the typically better online route when convenient, without unexpectedly losing the offline route. If the routes are sufficiently similar, the traffic information available in the online route, and other online data missing from the offline route, can be merged into the offline route at block 116.

Figure 3F:
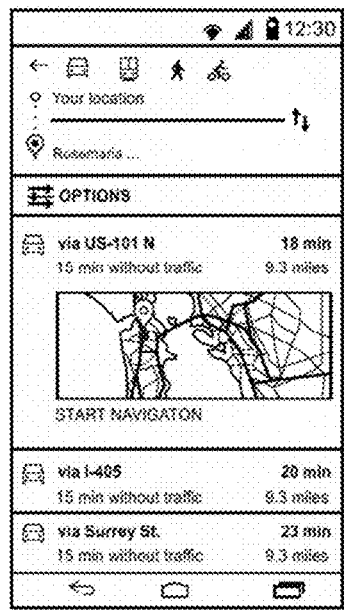

As illustrated in FIG. 3F, the geographic application can display one or several alternate routes in addition to the primary route. A previously presented offline route can be presented as one of the alternate options, even if the quality of the offline route is not sufficiently high for the list of alternates. In this manner, the geographic application ensures seamless transitions between online and offline modes.

Figure 3G:
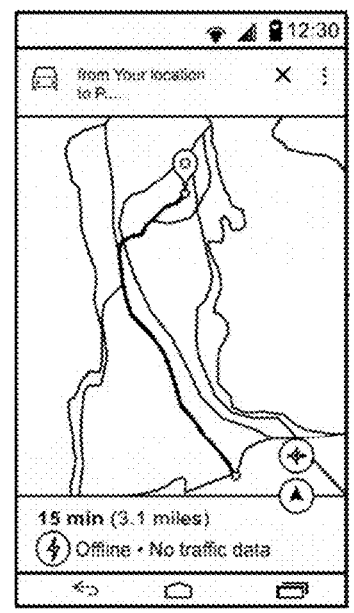

For further clarity, FIG. 3G illustrates a screen which the geographic application may generate in response to the user tapping on, or otherwise selecting, the offline navigation route offered in the screen of FIG. 3D, for example. The geographic application in this case may continue presenting an indication that offline data was to generate the route. The rest of the screen in this example is occupied by a more detailed overlay of the navigation route on a digital map.

If route options were successfully determined at block 108, and if the geographic application cannot fully accommodate these route options, an appropriate warning may be generated. For example, the geographic application may indicate that the offline route may contain tolls.

One example implementation of the techniques discussed in this section is a method in a computing device for providing navigation directions. The method includes (i) receiving a request for navigation directions for travelling from a source location to a destination location, (ii) generating, using one or more processors, first navigation directions for travelling from the source location to the destination location, using data that was stored in a memory of the computing device prior to the request, (iii) transmitting, using one or more processors, a request for navigation directions for travelling from the source location to the destination location to an online server, (iv) receiving, from the online server, second navigation directions for travelling from the source to the destination, (v) determining, using one or more processors, whether a difference between the first navigation directions and the second navigation directions exceeds a threshold level, and (vi) when the difference between the first navigation directions and the second directions route does not exceed the threshold level, merging the second navigation directions into the first navigation directions.

In some implementations, this method includes one or more of the following features. Determining the difference between the first navigation directions and the second navigation directions includes representing each of the first navigation directions and the second navigation directions as a respective set of waypoints, and comparing the first set to the second set to determine how many waypoints the two sets have in common relative the sizes of the first set and the second set. The method includes receiving traffic data along with the second navigation directions, and merging the second navigation directions into the first navigation directions includes adding traffic data to the first navigation directions.

Another implementation of these techniques is a computing device including one or more processors, a user interface, and a non-transitory computer-readable memory storing instructions executable by the one or more processors to implement the method above.

Example Techniques for Providing Suggestions and Search Results

The geographic application 14 can support search and suggest functionality in an online mode or in an offline mode. In the online mode, the geographic application 14 can provide a partially completed string to the auto-suggest server 23 and receive search results consistent with the partially completed string. In the offline mode, the geographic application 14 can compare the partially completed string to the offline geospatial data 64 to identify one or more results consistent with this input. These results can be provided to the user as suggestions. When displaying offline and online results as suggestions, the geographic application 14 can provide a visual indicator to indicate to the user whether the result was received from a network server or generated using offline data.

To provide geographic suggestions to users efficiently and in an intuitive manner, the geographic application 14 can display offline suggestions immediately or upon expiration of a small timeout, similar to the method 100 discussed above. Thus, the user can view offline suggestions while awaiting online suggestions.

If and when online data arrives, the geographic application 14 can identify duplicates among the results. In some cases, a duplicate online contains more information. For example, an online result can include the spelling of a place in both the native language and in the language of the user, whereas the offline result can include only one of the spellings. The geographic application 14 can augment an offline result with this additional information without listing the result more than once. Also, the geographic application 14 may arrange the results in the descending order of relevance, for example, without re-arranging the already-displayed offline search results (even if these search results rank relatively low), so as to prevent data from "jumping around" on the screen.

The offline results or suggestions can include high-quality results well as low-quality results. Typically, for high-quality results, a significant amount of information is available in the offline geospatial data 64. In some cases, high-quality offline search results are substantially of the same quality as online search results. Low-quality results can include significantly less information that high-quality offline search results. As indicated above, certain results can be stored with only partial information. Further, the cumulative quality of search results may be affected by whether these results correspond to a high probability of a match, such as when the name of a location the user types in matches only one result included in the offline geospatial data 64, or a low probability of match, such as when a partially completed string is consistent with multiple offline results (thus making it highly likely that the user does not wish to see most of these results).

Figure 4:
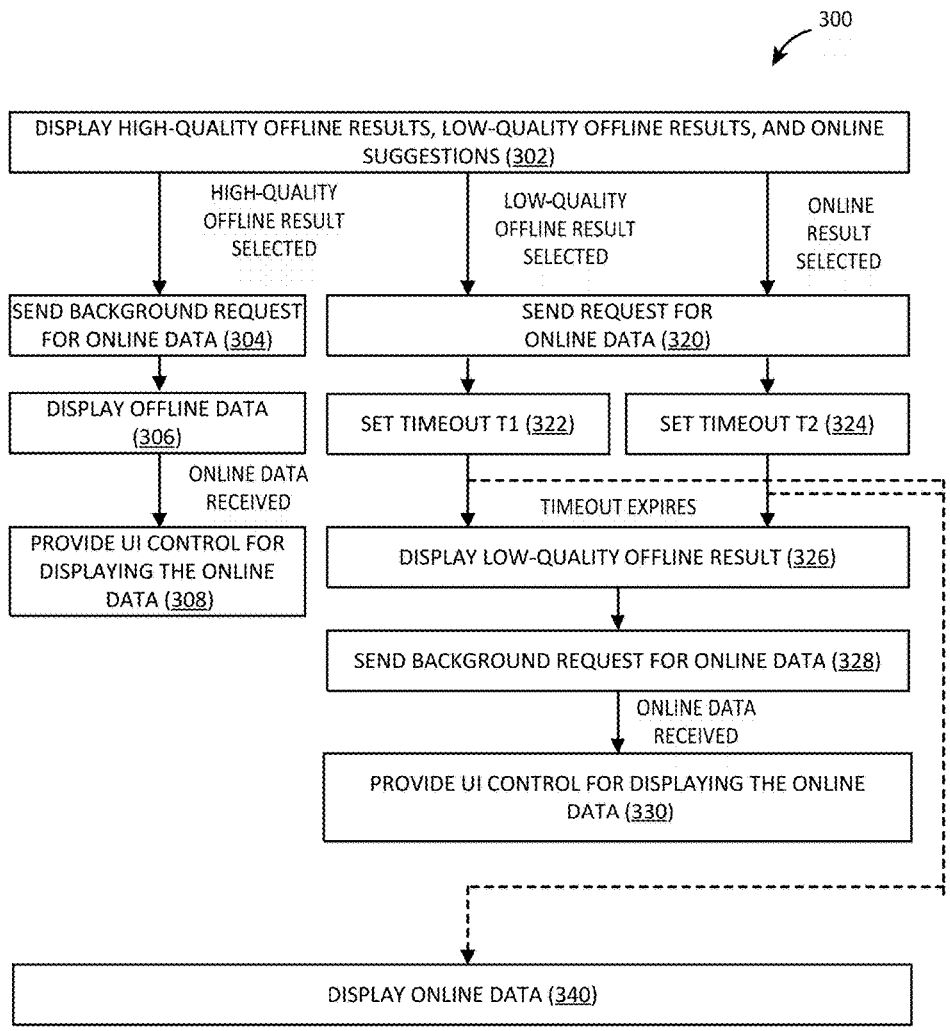
FIG. 4 is a flow diagram of an example method for providing offline suggestions and search results using online and offline data, which can be implemented in the client device of FIG. 1.

The geographic application 14 can implement certain trade-offs between time delays and improvements in quality. In particular, FIG. 4 illustrates an example method 300 for providing offline suggestions and search results when the geographic application 14 displays a mixture of high-quality offline suggestions, low-quality offline suggestions, and online suggestions. The method 300 begins at block 302, where a mixture of search results/suggestions is displayed as discussed above. The user then selects one of the results, which can be of an online result or an offline result of a high or low quality.

If a high-quality offline result is selected, the flow proceeds to blocks 304 and 306, where a background request for online data is sent out and the offline data is displayed. For example, upon the user types "Mag," the geographic application 14 displays the header for "Magnolia Café" as a high-quality offline suggestion and, at block 306, displays the rest of the available offline information. Because the request is sent in the background, the geographic application 14 in this implementation does not provide an indication of an online request, so as not to discourage the user from viewing the offline data. The available offline information can include a brief review, the average rating, the number of rating, the hours of operation, etc. If online data subsequently is received, the geographic application 14 can provide a UI control for displaying the online data.

If a low-quality offline result is selected, the flow first proceeds to block 320, where a request for online data is sent out. The geographic application 14 in this case may provide an indication of a pending online request to the user. Similarly, if an online result is selected, the flow also first proceeds to block 320.

At block 322, a relatively short timeout T1 may be set (e.g., 2 seconds) for a low-quality offline result. For an online result, a longer timeout T2 may be set (e.g., 7 seconds) at block 324. If online data is received within the respective time interval, the online data is displayed at block 340. Otherwise, upon expiration of the timeout T1 or T2, or failure of the online request, the flow proceeds to block 326, where a low-quality offline result is displayed.

Next, at block 328, a background request for online data is sent out, similar to block 304. If online data eventually arrives while the low-quality offline result is being displayed, a UI control for displaying the online data is provided at block 330. Upon activating of this control, the flow proceeds to block 340.

One example implementation of the techniques discussed in this section is a method in a computing device for providing suggestions consistent with partially entered user input. The method includes (i) receiving, via a user interface of a computing device, partial input corresponding to one or more first characters of a search term being entered by a user; (ii) automatically providing, using one or more processors, a plurality of suggestions consistent with the partial input, including (a) a high-quality offline suggestion generated using offline data stored in a memory of the computing device, (b) a low-quality suggestion generated using offline data stored in the memory, where high-quality offline suggestions include an amount of data above a certain threshold, and low-quality offline suggestions include an amount of data below the threshold, and (c) an online suggestion received from an online server; (iii) when a selection of the high-quality offline suggestion is received, providing offline data corresponding to the high-quality offline suggestion; or (iv) when a selection of the low-quality offline suggestion or of the online suggestion is received (a) requesting corresponding online data and (b) display low-quality offline data corresponding to the suggestion upon timer expiration.

In some implementations, this method includes one or more of the following features. If the low-quality suggestion is selected, using a first timeout value, and, if the online suggestion is selected, using a second timeout value, where the second timeout value is larger than the first timeout value. When the high-quality offline suggestion is selected, the method includes requesting online data as a background task.

Another implementation of these techniques is a computing device including one or more processors, a user interface, and a non-transitory computer-readable memory storing instructions executable by the one or more processors to implement the method above.

Example Techniques for Providing Indications of Upcoming Areas of No Offline Data Coverage As indicated above, the geographic application 14 in some cases may generate an offline route that traverses area(s) for which no potentially relevant offline geospatial data is available. Example operation of the geographic application 14 in such cases is discussed next with reference to FIGS. 5A-7G. Each of the methods of FIGS. 5A-C can be implemented in the geographic application 14 or, more generally, as a set of instructions executable on one or more processors of a single device or a group of devices.

Figure 5A:
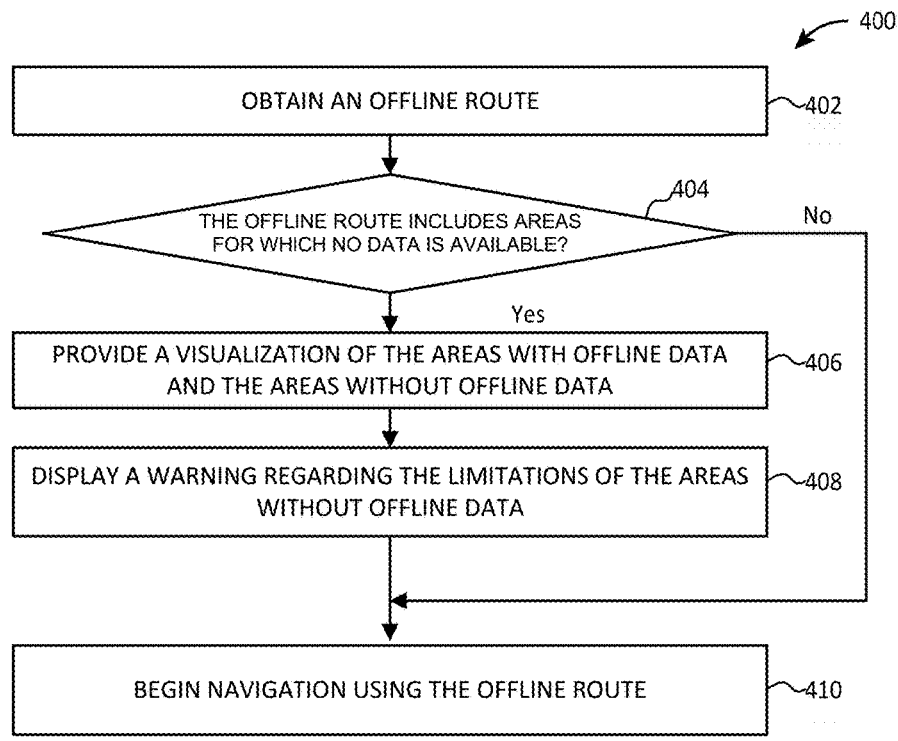
FIG. 5A is a flow diagram of an example method for providing an indication that an offline route traverses geographic areas for which no offline data is available, prior to navigation, which can be implemented in a geographic application executing on the client device of FIG. 1.

Referring first to FIG. 5A, a method 400 is for providing an indication that an offline route traverses geographic areas for which no offline data is available, prior to navigation. At block 403, an offline route is obtained. Even when the geometry for the offline route and the step-by-step directions can be generated for the offline route, the offline geospatial data 64 and the offline place page data 66 (see FIG. 1) may not include any data relevant to certain portions of the offline route. Moreover, the offline route may traverse for which no offline road data, other than the portion already included in the offline route, is available. If it is determined at block 404 that the offline route traverses an area for which no offline data is available, the flow proceeds to block 406. Otherwise, the flow proceeds to block 410, where navigation using the offline can begin upon receiving an appropriate command from the user.

In some cases, the areas which the method 400 can identify similarly to areas of no offline data are area for which only limited data is stored. For example, the limited data may lack information related to a major functional area such as search, map data for displaying a digital map, or directions, for example. As a more specific example, for a certain area, only low-resolution map data is stored, or only major highways for navigation, whereas for most or all of the other areas related to the navigation route, high-resolution map data and highways along with smaller roads are stored for navigation. In some cases, routing and digital map generation may be fully functional in an offline mode, but search may be unavailable. In other cases, routing may not be available.

Figure 6A:
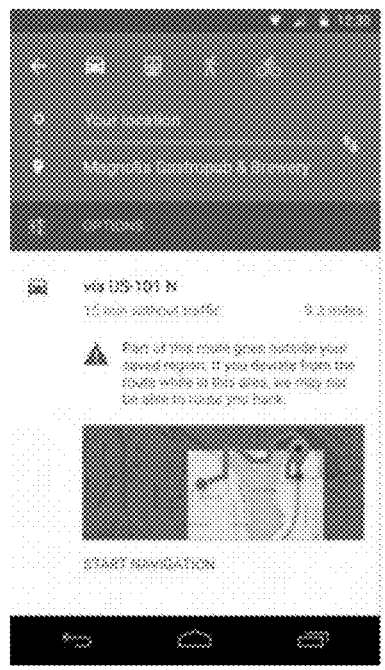
FIG. 6A is an example screenshot which a geographic application can generate when executing the method of FIG. 5A.

At blocks 406, a visualization of the area with offline data and the areas without offline data is generated, as illustrated in FIG. 6A, for example. At block 408, a warning regarding the limitations associated with areas with no offline data is displayed. For example, the geographic application 14 can grey out the areas with no offline data on the map and display a warning to the user that the geographic application 14 may not be able to route the user back if the user strays away from the offline route. The warning may be specific to the limitation of the offline data. Upon receiving an acknowledgement from the user, or upon expiration of a timeout, the flow proceeds to block 410 to begin offline navigation.

Figure 5B:
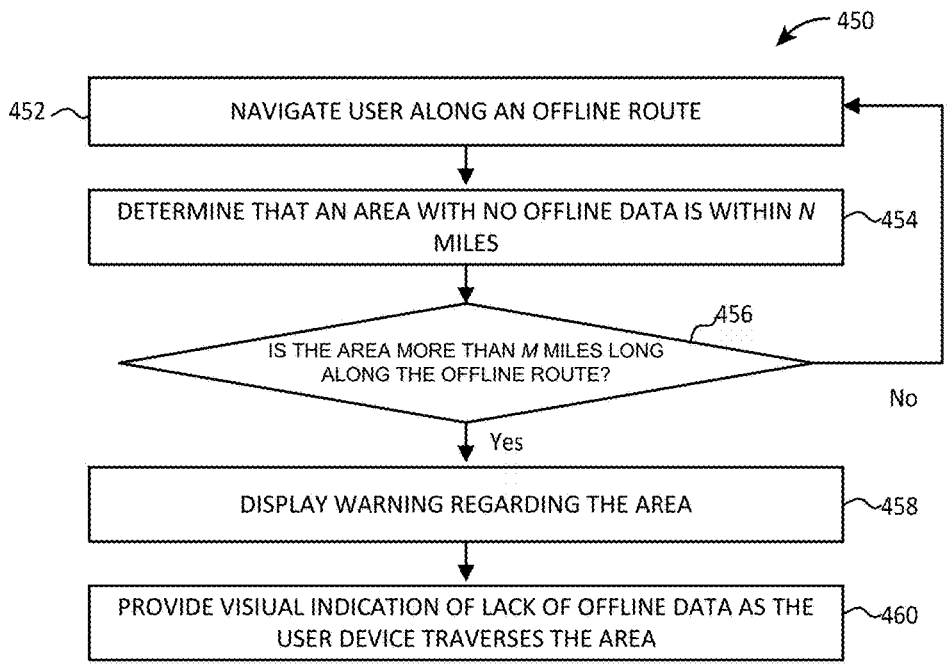
FIG. 5B is a flow diagram of an example method for providing an indication that an offline route traverses geographic areas for which no offline data is available, during navigation, which can be implemented in a geographic application executing on the client device of FIG. 1

During navigation, the geographic application 14 can execute an example method 450 for providing an indication that an offline route traverses geographic areas for which no offline data is available, as illustrated in FIG. 5B.

Figure 6B:
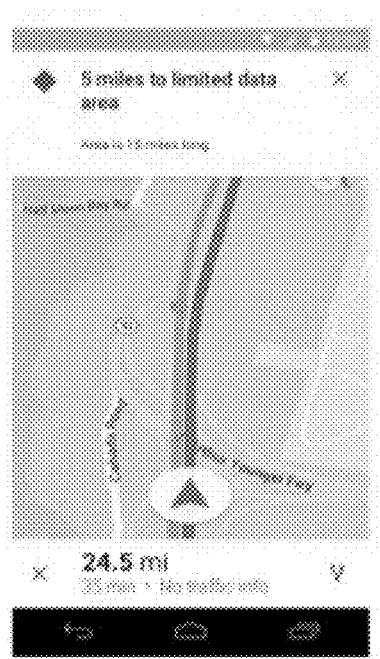
FIGS. 6B and 6C are example screenshots which a geographic application can generate when executing the method of FIG. 5B.
Figure 6C:
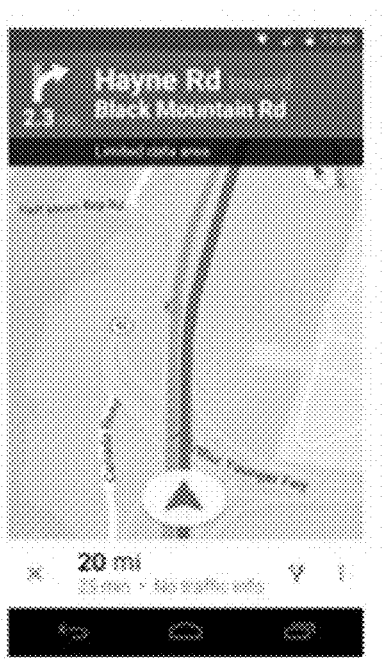

At block 453, the geographic application 14 navigates the user along an offline route by moving an indicator of current location on the digital map, display textual step-by-step instructions, announcing the instructions in an audio format, etc. At block 454, it is determined that an area with no offline data is within N miles of the user's current location (e.g., 5 miles). If the area with no offline data is longer than a M miles along the offline route (e.g., 10 miles), a warning regarding the area may be provided. In particular, as illustrated in FIG. 6B, a message may be prominently displayed specifying the distance remaining to the border of the area, the size of the area, etc. Further, a graphical indication can be provided on the digital map in the form of a greyed-out region, for example. In other scenarios, this warning (as well as other warnings and messages of this disclosure) may be provided audibly or in a tactile manner (e.g., by a vibration signal). As the user drives through the area with no offline coverage, the navigation may appear "normal," but the geographic application 14 can continue to display an indicator of no offline data availability, as illustrated in FIG. 6C, for example.

Figure 5C:
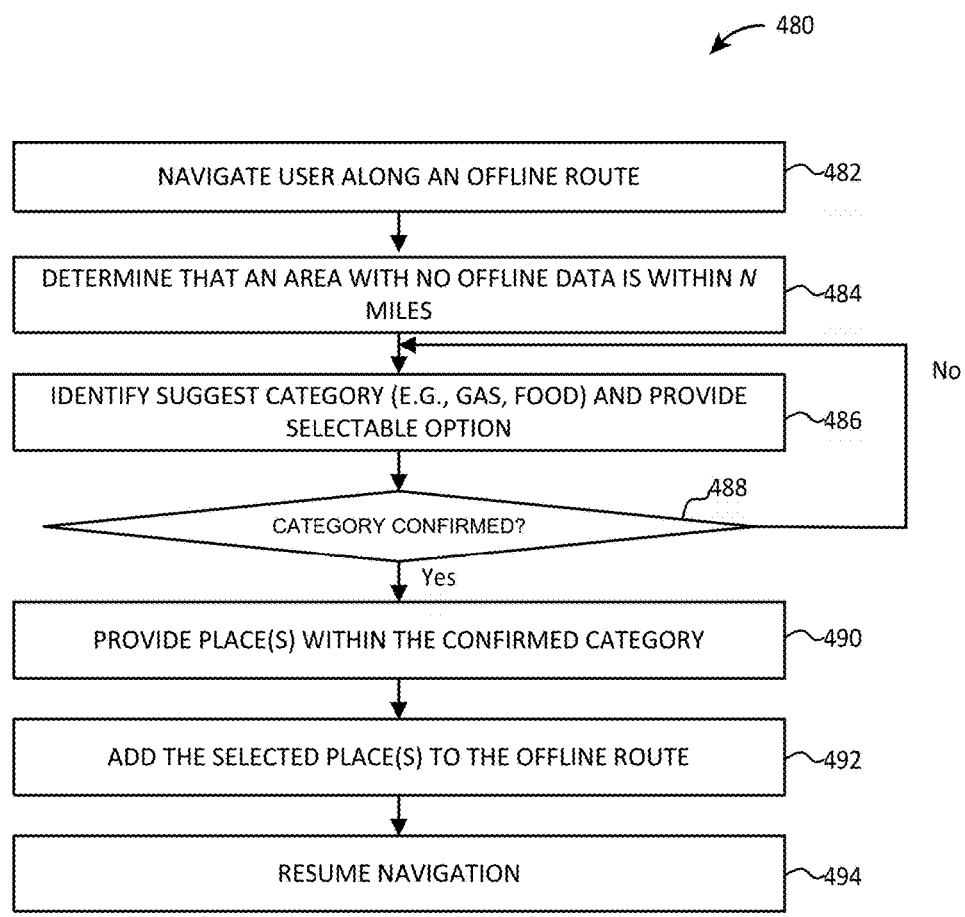
FIG. 5C is a flow diagram of an example method for providing suggestions in view of geographic areas for which no offline data is available, the geographic areas being disposed along the currently selected navigation route, which can be implemented in a geographic application executing on the client device of FIG. 1.

Further, FIG. 5C is a flow diagram of example method 480 for providing suggestions in view of geographic areas for which no offline data is available, the geographic areas being disposed along the currently selected navigation route.

At block 482, the geographic application 14 navigates the user along an offline route, as illustrated in FIG. 7A. Next, at block 484, it is determined that an area with no offline data is within N miles of the current location. A suggest category, such as food or gas, is provided as a selectable option at block 486, as illustrated in FIG. 7B. More specifically, the geographic application can suggest to the user that she get gas or food before entering the area where the geographic application 14 cannot provide any additional information to the user. If the user selects the category at block 477, the flow proceeds to block 490. Otherwise, the flow returns to block 486, where a new category may be selected.

At block 490, places within the confirmed category are suggested, as illustrated in FIG. 7C. If the user selects one of these places, the place is added to the route at block 492, as illustrated in FIG. 7D. This interim destination may be displayed on the map as illustrated in FIG. 7E. Navigation resumes at block 494, as illustrated in FIG. 7F. When the user reaches the area with no offline data, an appropriate indicator may be provided on the map, as illustrated in FIG. 7G.

One example implementation of the techniques discussed in this section is a method in a computing device for notifying users of upcoming loss of offline data coverage when navigating the user along an offline route. The method includes (i) receiving a request for navigation directions for travelling from a source location to a destination location, (ii) generating, using one or more processors, navigation directions for travelling from the source location to the destination location, using data that was stored in a memory of the computing device prior to the request, the navigation directions defining an offline navigation route, (iii) determining, using one or more processors, that the offline navigation traverses an area of at least a certain size, for which the memory of the computing device stores no offline data or only limited data related to places disposed along the navigation route, (iv) in response to determining that the computing device is within a certain threshold distance of a boundary of the area, automatically providing a notification related to the area via a user interface of the computing device.

In some implementations, this method includes one or more of the following features. The method includes automatically suggesting a specific category of businesses to search prior to reaching the area. The specific category may be gas stations, for example. The method includes generating a visualization of the area with no offline data or only limited data, relative to other areas displayed on the digital map.

Another implementation of these techniques is a computing device including one or more processors, a user interface, and a non-transitory computer-readable memory storing instructions executable by the one or more processors to implement the method above.

Example Techniques for Providing Place Information in Different Modes

Figure 8:
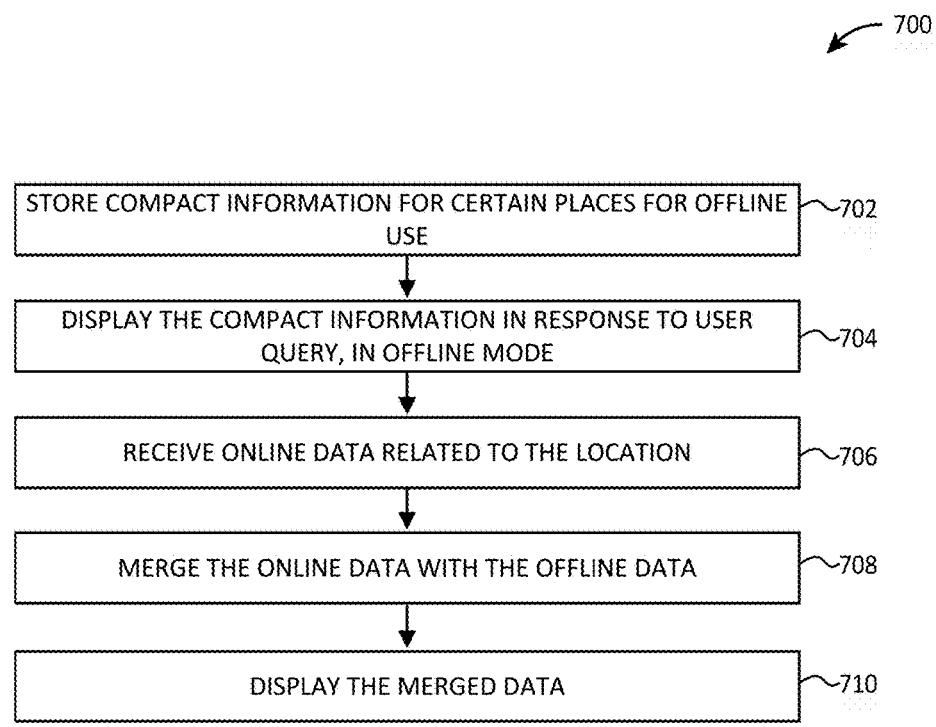
FIG. 8 is a flow diagram of an example method for providing information about geographic places in an offline mode and in an online mode, which can be implemented in the client device of FIG. 1.

Referring to FIG. 8, an example method 700 for providing information about geographic places in an offline mode and in an online mode also can be implemented in the geographic application 14 or another suitable software module or modules.

The method 700 begins at block 702, where compact information is stored for certain places, for subsequent use in the offline mode. As discussed above, the compact information for a place can include a subset of the data available at the place page database 34, such as the telephone number for a business, the hours of operation, the number of ratings received and the average on a certain scale, the address, and, when available, an editorial summary.

At block 704, the compact information is displayed in an offline mode in response to a query or automatically as part of a suggestion. At block 706, online data related to the place is received and, at block 708, the received online data is merged with the offline data. The merged data is displayed at block 710. For example, as discussed above, a search result may be displayed in the same position on a list, but a foreign-language spelling of the place may be added. If the user already pulled up an informational card displaying limited or compact information for the place, the geographic application 14 may selectively merge the online data into the informational sheet. For example, the geographic application 14 now may display a control for upgrading the display of the result of, if no re-arrangement of the already-displayed data is required, may add additional inks, images, etc. at the bottom.

One example implementation of the techniques discussed in this section is a method in a computing device for providing information regarding businesses. The method includes (i) receiving, at a computing device from an online server, complete information related to a geolocated place, (ii) storing, in a memory of the computing device, a subset of the complete information, (iii) subsequently providing the stored subset of the received information via a user interface of the computing device, (iv) receiving the complete information related to the geolocated place from the online server, (v) merging the complete information with the subset of the complete information; and (vi) displaying the merged information via the user interface.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain implementations are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example implementations, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one implementation" or "an implementation" means that a particular element, feature, structure, or characteristic described in connection with the implementation is included in at least one implementation. The appearances of the phrase "in one implementation" in various places in the specification are not necessarily all referring to the same implementation.

Some implementations may be described using the expression "coupled" and "connected" along with their derivatives. For example, some implementations may be described using the term "coupled" to indicate that two or more elements are in direct physical or electrical contact. The term "coupled," however, may also mean that two or more elements are not in direct contact with each other, but yet still co-operate or interact with each other. The implementations are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the implementations herein. This is done merely for convenience and to give a general sense of various implementations. This description should be read to include one or at least one and the singular also includes the plural unless it is obvious that it is meant otherwise.

Upon reading this disclosure, those of ordinary skill in the art will appreciate still additional alternative structural and functional designs for merging online geospatial suggestions with offline geospatial suggestions through the disclosed principles herein. Thus, while particular implementations and applications have been illustrated and described, it is to be understood that the disclosed implementations are not limited to the precise construction and components disclosed herein. Various modifications, changes and variations, which will be apparent to those skilled in the art, may be made in the arrangement, operation and details of the method and apparatus disclosed herein.

What is claimed is:

1. A method in a computing device for providing navigation directions, the method comprising:
   receiving a request for navigation directions for travelling from a source location to a destination location;
   generating, by one or more processors using data that was stored in a memory of the computing device prior to the request, first navigation directions for travelling from the source location to the destination location;
   transmitting, using one or more processors, a request for navigation directions for travelling from the source location to the destination location to an online server;
   receiving, from the online server, second navigation directions for travelling from the source to the destination, including receiving traffic data;
   determining, using one or more processors, whether a difference between the first navigation directions and the second navigation directions exceeds a threshold level; and
   in a first instance, when the difference between the first navigation directions and the second directions does not exceed the threshold level, merging the second navigation directions into the first navigation directions, including adding the traffic data to the first navigation directions, and
   in a second instance, when the difference between the first navigation directions and the second directions exceeds the threshold level, providing the second navigation directions via a user interface.

2. The method of claim 1, wherein determining the difference between the first navigation directions and the second navigation directions includes:
   representing each of the first navigation directions and the second navigation directions as a respective set of waypoints, and
   comparing the first set to the second set to determine how many waypoints the two sets have in common relative to the sizes of the first set and the second set.

3. The method of claim 2, wherein comparing the first set to the second set includes assigning a larger weight to waypoints proximate to a current location of the computing device.

4. The method of claim 1, further comprising displaying an indication that navigation directions are being retrieved from the online server, along with the first navigation directions.

5. The method of claim 1, further comprising determining previously set route options prior to generating the first navigation directions, and wherein generating the first navigation directions includes applying the previously set route options.

6. The method of claim 1, wherein providing the second navigation directions via the user interface includes:
presenting the first navigation directions as a primary route and
providing the second navigation directions as a selectable alternative.

7. The method of claim 1, further comprising:
presenting the first navigation directions via the user interface while the second navigation directions are unavailable;
determining, using one or more processors, that the first navigation directions define a route that traverses an area of at least a certain size, for which the memory of the computing device stores no offline data or only limited data related to places disposed along the route; and
in response to determining that the computing device is within a certain threshold distance of a boundary of the area, automatically providing a notification related to the area via the user interface.

8. The method of claim 7, further comprising automatically suggesting a specific category of businesses to search prior to reaching the area, via the user interface.

9. The method of claim 7, further providing an indication of a size of the area.

10. A computing device comprising:
one or more processors,
a user interface; and
a non-transitory computer-readable memory storing instructions executable by the one or more processors configured to implement a method including:
receiving a request for navigation directions for travelling from a source location to a destination location,
generating, using data that was stored in the memory prior to the request, first navigation directions for travelling from the source location to the destination location,
transmitting a request for navigation directions for travelling from the source location to the destination location to an online server,
receiving, from the online server, second navigation directions for travelling from the source to the destination, including receiving traffic data,
determining whether a difference between the first navigation directions and the second navigation directions exceeds a threshold level, and
in a first instance, when the difference between the first navigation directions and the second directions route does not exceed the threshold level, merging the second navigation directions into the first navigation directions including adding the traffic data to the first navigation directions, and
in a second instance, when the difference between the first navigation directions and the second directions exceeds the threshold level, providing the second navigation directions via a user interface.

11. The computing device of claim 10, wherein determining the difference between the first navigation directions and the second navigation directions includes:
representing each of the first navigation directions and the second navigation directions as a respective set of waypoints, and
comparing the first set to the second set to determine how many waypoints the two sets have in common relative to the sizes of the first set and the second set.

12. The computing device of claim 11, wherein comparing the first set to the second set includes assigning a larger weight to waypoints proximate to a current location of the computing device.

13. The computing device of claim 10, wherein the method further includes displaying an indication that navigation directions are being retrieved from the online server, along with the first navigation directions.

14. A non-transitory computer-readable memory storing instructions that, when executed by one or more processors, cause the one or more processors to implement a method comprising:
receiving a request for navigation directions for travelling from a source location to a destination location;
generating, by one or more processors using data that was stored in a memory of the computing device prior to the request, first navigation directions for travelling from the source location to the destination location;
transmitting, using one or more processors, a request for navigation directions for travelling from the source location to the destination location to an online server;
receiving, from the online server, second navigation directions for travelling from the source to the destination, including receiving traffic data;
determining, using one or more processors, whether a difference between the first navigation directions and the second navigation directions exceeds a threshold level; and
in a first instance, when the difference between the first navigation directions and the second directions route does not exceed the threshold level, merging the second navigation directions into the first navigation directions including adding the traffic data to the first navigation directions, and
in a second instance, when the difference between the first navigation directions and the second directions exceeds the threshold level, providing the second navigation directions via a user interface.

15. The non-transitory computer-readable memory of claim 14, wherein determining the difference between the first navigation directions and the second navigation directions includes:
representing each of the first navigation directions and the second navigation directions as a respective set of waypoints, and
comparing the first set to the second set to determine how many waypoints the two sets have in common relative to the sizes of the first set and the second set.

16. The non-transitory computer-readable memory of claim 15, wherein comparing the first set to the second set includes assigning a larger weight to waypoints proximate to a current location of the computing device.

17. The non-transitory computer-readable memory of claim 14, wherein the method further includes displaying an indication that navigation directions are being retrieved from the online server, along with the first navigation directions.

18. The non-transitory computer-readable memory of claim 14, wherein the method further includes determining previously set route options prior to generating the first navigation directions, and wherein generating the first navigation directions includes applying the previously set route options.

* * * * *